United States Patent
Khorram et al.

(10) Patent No.: US 7,079,816 B2
(45) Date of Patent: Jul. 18, 2006

(54) ON CHIP DIVERSITY ANTENNA SWITCH

(75) Inventors: Shahla Khorram, Los Angeles, CA (US); Brima B. Ibrahim, Los Angeles, CA (US); Bojko F. Marholev, Marina del Rey, CA (US)

(73) Assignee: Broadcom Corporation, Irvine, CA (US)

( * ) Notice: Subject to any disclaimer, the term of this patent is extended or adjusted under 35 U.S.C. 154(b) by 486 days.

(21) Appl. No.: 10/460,607

(22) Filed: Jun. 12, 2003

(65) Prior Publication Data

US 2004/0214528 A1 Oct. 28, 2004

Related U.S. Application Data

(60) Provisional application No. 60/465,421, filed on Apr. 25, 2003.

(51) Int. Cl.
*H04B 1/44* (2006.01)
(52) U.S. Cl. ............ 455/78; 455/101; 455/277.1; 455/277.2; 455/575.1; 455/553.1; 455/83; 455/273; 342/371; 342/373; 342/370; 343/828; 343/850; 343/700
(58) Field of Classification Search ............ 455/78, 455/101, 277.1, 575.1, 73, 277.2; 342/370, 342/371, 373; 343/828, 850, 700, 826
See application file for complete search history.

(56) References Cited

U.S. PATENT DOCUMENTS

| | | | | |
|---|---|---|---|---|
| 5,822,684 | A * | 10/1998 | Kitakubo | 455/78 |
| 6,148,218 | A * | 11/2000 | Solondz | 455/562.1 |
| 6,351,237 | B1 * | 2/2002 | Martek et al. | 342/361 |
| 6,560,443 | B1 * | 5/2003 | Vaisanen et al. | 455/73 |
| 6,577,189 | B1 * | 6/2003 | Jayaraman et al. | 330/107 |
| 6,630,899 | B1 * | 10/2003 | Jayaraman | 341/200 |
| 6,721,544 | B1 * | 4/2004 | Franca-Neto | 455/83 |
| 6,798,288 | B1 * | 9/2004 | Jayaraman et al. | 330/207 A |

* cited by examiner

*Primary Examiner*—Marceau Milord
(74) *Attorney, Agent, or Firm*—Garlick Harrison & Markison

(57) ABSTRACT

An on chip diversity antenna switch includes a first switch, a second switch, a third switch, and a fourth switch. The first switch is operably coupled to a pin associated with a first antenna, to a transmit path and to receive a transmit receive (T/R) control signal. The second switch is operably coupled to the pin associated with the first antenna, to a receive path, and to receive the T/R control signal. The third switch is operably coupled to a pin associated with a second antenna, the transmit path, and to receive the T/R control signal. The fourth switch is operably coupled to the pin associated with the second antenna, to the receive path, and to receive the T/R control signal. Based on the T/R control signal, the first or second antenna is coupled to the transmit or receive path via a single switch.

20 Claims, 4 Drawing Sheets

T/R switch module 73

T/R switch module 73

ON CHIP DIVERSITY ANTENNA SWITCH

This invention is claiming priority under 35 USC § 119(e) to a provisionally filed patent application having the same title as the present patent application, a filing date of Apr. 25, 2003, and an application No. Ser. of 60/465,421.

BACKGROUND OF THE INVENTION

1. Technical Field of the Invention

This invention relates generally to wireless communications systems and more particularly to wireless communication devices.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

As is also known, the receiver is coupled to the antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

Even though wireless communication devices include a transmitter and receiver, they generally communicate in a half duplex manner, i.e. they are either transmitting or receiving. As such, a wireless communication device may include a single antenna structure, which may include one antenna or a diversity antenna structure that is shared by the receiver and the transmitter of the device. To facilitate the sharing of the antenna structure, the wireless communication device includes at least one transmit/receive (T/R) switch.

In general the T/R switch couples either the receiver path or the transmitter path of the wireless communication device to the antenna structure. Since the T/R switch is coupling radio frequency (RF) signals in the megahertz to gigahertz range, the T/R switch must have a stable frequency response over the frequency range of interest. As such, the T/R switch is generally an off chip device or is fabricated using gallium arsenide integrated circuit process. Neither implementation is ideal for a CMOS implemented radio frequency integrated circuit (RFIC).

Another issue with T/R switches is when used by a wireless communication device that employs a diversity antenna structure. As is known, a diversity antenna structure includes two or more antennas that are physically separated (e.g. by a quarter wave length, half wave length, or full wave length) but receive the same signal. The antenna that receives the signal with the largest signal strength is selected for use by the wireless communication device. For a two antenna diversity structure, the wireless communication device includes two transmit receive switches: one to select the transmit or receive path and the other to select the first or second antenna. In this instance, since the RF signals are traversing two T/R switches, the T/R switches need to be extra clean (i.e. have a flat frequency response over the frequency range of interest and induce very little noise) making it essential to use off chip T/R switches or gallium arsenide integrated circuit T/R switches in conjunction with a CMOS radio frequency integrated circuit, which dramatically adds to the cost of a radio frequency integrated circuit.

Therefore, a need exists for an on chip implementation of a transmit receive switch that provides clean RF switching for single or diversity antenna structures.

BRIEF SUMMARY OF THE INVENTION

The on chip diversity antenna switch of the present invention substantially meets these needs and others. In one embodiment, the on chip diversity antenna switch includes a first switch, a second switch, a third switch, and a fourth switch. The first switch is operably coupled to a pin associated with a first antenna, to a transmit path and to receive a transmit receive (T/R) control signal. The second switch is operably coupled to the pin associated with the first antenna, to a receive path, and to receive the T/R control signal. The third switch is operably coupled to a pin associated with a second antenna, the transmit path, and to receive the T/R control signal. The fourth switch is operably coupled to the pin associated with the second antenna, to the receive path, and to receive the T/R control signal. When the T/R control signal is in a first state the first switch is active to couple the pin associated with the first antenna to the receive path. When the T/R control signal is in a second state, the second switch is active to couple the receive path to the pin associated with the first antenna. When the T/R control signal is in a third state, the third switch is active to couple the pin associated with the second antenna to the transmit path. When the T/R control signal is in a fourth state, the fourth switch is active to couple the pin associated with the second antenna to the transmit path. Accordingly, with such an on chip diversity antenna, the coupling of multiple antennas to the transmit or receive path traverses only a single switch thereby reducing the adverse effects of traversing multiple switches.

In another embodiment, an on chip diversity antenna switch includes a first means, a second means, a third means, and a fourth means. The first means couples a pin associated with a first antenna to a transmit path when a T/R control signal is in a first state. The second means couples the pin associated with a first antenna to a receive path when a T/R control signal is in a second state. The third means couples a pin associated with a second antenna to a transmit path when a T/R control signal is in a third state. The fourth means couples a pin associated with a second antenna to the receive path when a T/R control signal is in a fourth state.

DETAILED DESCRIPTION OF THE INVENTION

Figure 1:
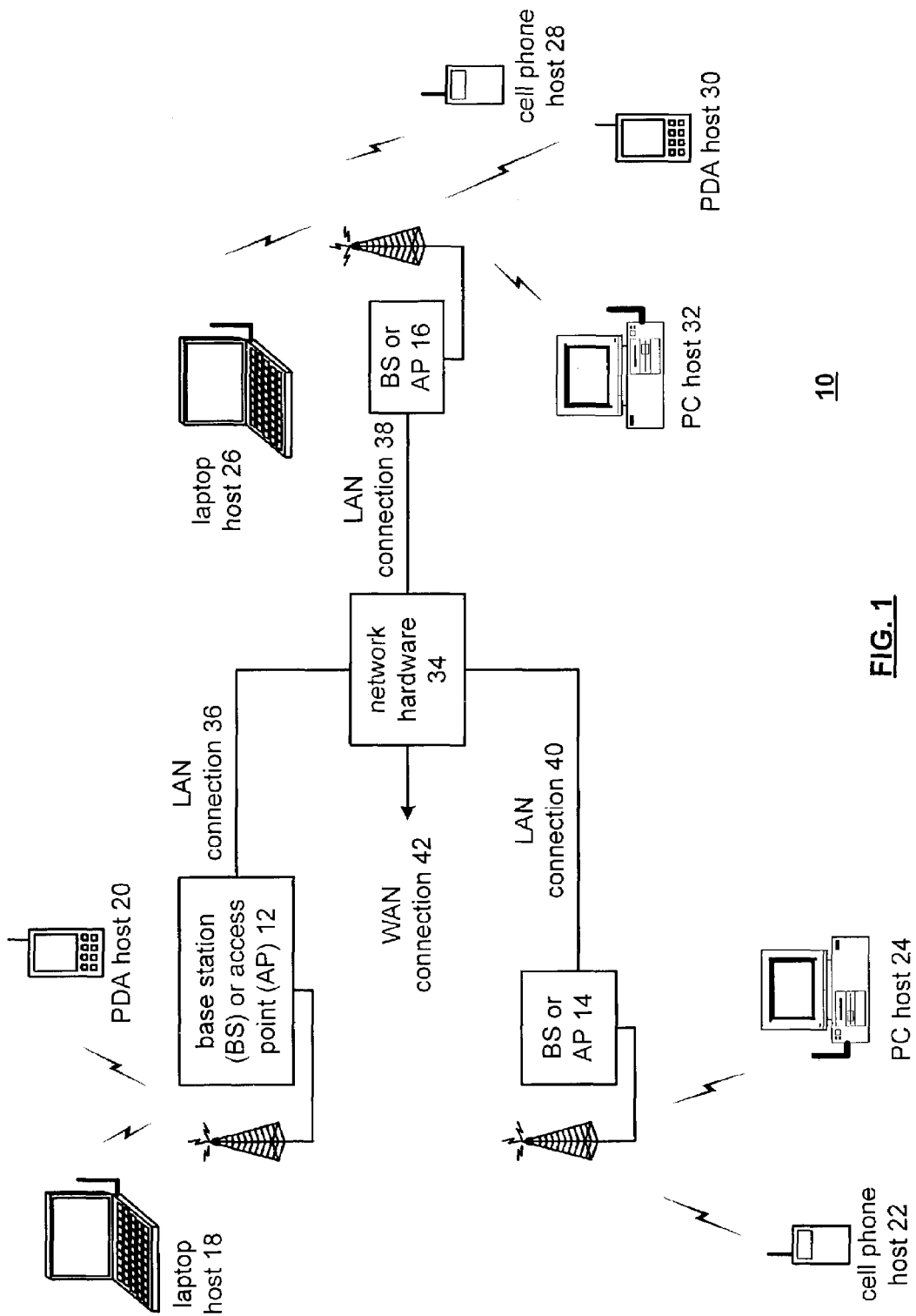
FIG. 1 is a schematic block diagram of a wireless communication system in accordance with the present invention.

FIG. 1 is a schematic block diagram illustrating a communication system 10 that includes a plurality of base stations and/or access points 12–216, a plurality of wireless communication devices 18–32 and a network hardware component 34. The wireless communication devices 18–32 may be laptop host computers 18 and 26, personal digital assistant hosts 20 and 30, personal computer hosts 24 and 32 and/or cellular telephone hosts 22 and 28. The details of the wireless communication devices will be described in greater detail with reference to FIG. 2.

The base stations or access points 12–16 are operably coupled to the network hardware 34 via local area network connections 36, 38 and 40. The network hardware 34, which may be a router, switch, bridge, modem, system controller, et cetera provides a wide area network connection 42 for the communication system 10. Each of the base stations or access points 12–16 has an associated antenna or antenna array to communicate with the wireless communication devices in its area. Typically, the wireless communication devices register with a particular base station or access point 12–14 to receive services from the communication system 10. For direct connections (i.e., point-to-point communications), wireless communication devices communicate directly via an allocated channel.

Typically, base stations are used for cellular telephone systems and like-type systems, while access points are used for in-home or in-building wireless networks. Regardless of the particular type of communication system, each wireless communication device includes a built-in radio and/or is coupled to a radio. The radio includes a highly linear amplifier and/or programmable multi-stage amplifier as disclosed herein to enhance performance, reduce costs, reduce size, and/or enhance broadband applications.

Figure 2:
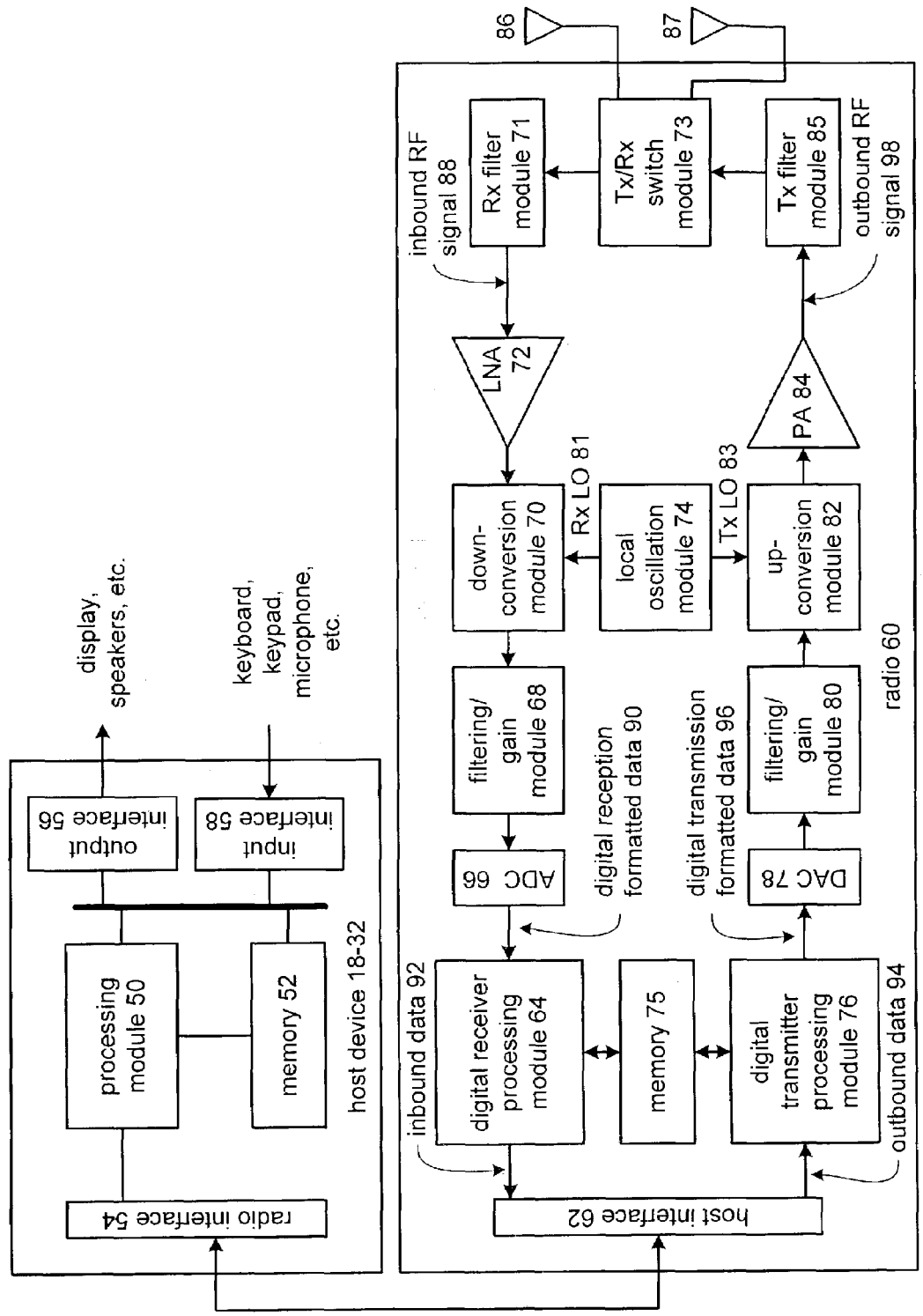
FIG. 2 is a schematic block diagram of a wireless communication device in accordance with the present invention.

FIG. 2 is a schematic block diagram illustrating a wireless communication device that includes the host device 18–32 and an associated radio 60. For cellular telephone hosts, the radio 60 is a built-in component. For personal digital assistants hosts, laptop hosts, and/or personal computer hosts, the radio 60 may be built-in or an externally coupled component.

As illustrated, the host device 18–32 includes a processing module 50, memory 52, radio interface 54, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the-radio interface 54 provides the data to the processing module 50 for further processing and/or routing to the output interface 56. The output interface 56 provides connectivity to an output display device such as a display, monitor, speakers, et cetera such that the received data may be displayed. The radio interface 54 also provides data from the processing module 50 to the radio 60. The processing module 50 may receive the outbound data from an input device such as a keyboard, keypad, microphone, et cetera via the input interface 58 or generate the data itself. For data received via the input interface 58, the processing module 50 may perform a corresponding host function on the data and/or route it to the radio 60 via the radio interface 54.

Figure 3:
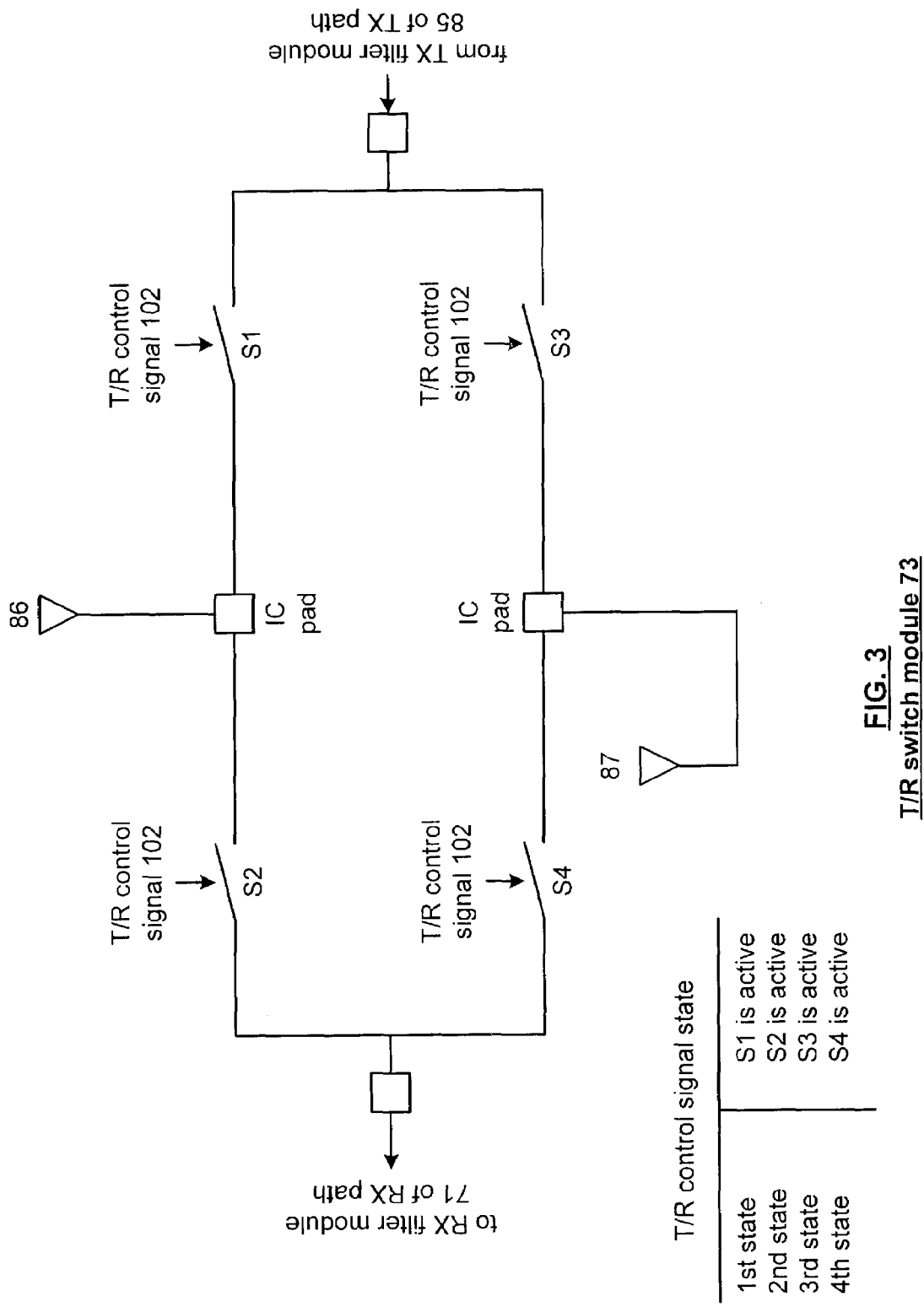
FIG. 3 is a schematic block diagram of a T/R switch module in accordance with the present invention.
Figure 4:
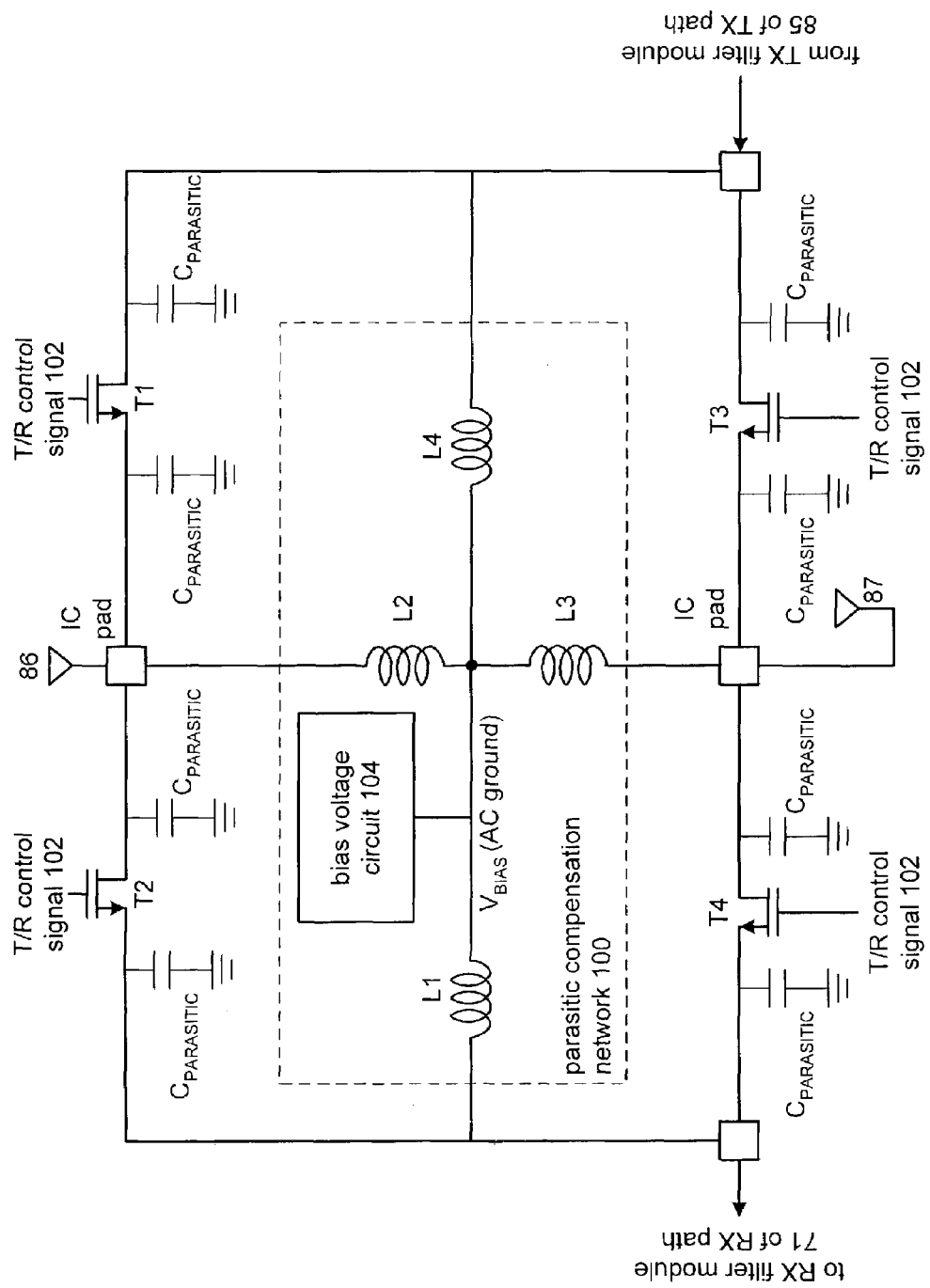
FIG. 4 is a schematic block diagram of an alternate T/R switch module in accordance with the present invention.

Radio 60 includes a host interface 62, digital receiver processing module 64, an analog-to-digital converter 66, a filtering/attenuation module 68, an IF mixing down conversion stage 70, a receiver filter 71, a low noise amplifier 72, a transmitter/receiver switch 73, a local oscillation module 74, memory 75, a digital transmitter processing module 76, a digital-to-analog converter 78, a filtering/gain module 80, an IF mixing up conversion stage 82, a power amplifier 84, a transmitter filter module 85, and antennas 86 and 87. The antennas 86 and 87 are physically separated by a quarter wavelength, half wavelength, or full wavelength to provide an antenna diversity structure for the wireless communication device. The T/R switch module 73, as will be discussed with reference to FIGS. 3 and 4, provides the coupling of the antennas 86 and 87 to either the transmit path or the receive path of the wireless communication device.

The digital receiver processing module 64 and the digital transmitter processing module 76, in combination with operational instructions stored in memory 75, execute digital receiver functions and digital transmitter functions, respectively. The digital receiver functions include, but are not limited to, digital intermediate frequency to baseband conversion, demodulation, constellation demapping, decoding, and/or descrambling. The digital transmitter functions include, but are not limited to, scrambling, encoding, constellation mapping, modulation, and/or digital baseband to IF conversion. The digital receiver and transmitter processing modules 64 and 76 may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 75 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64 and/or 76 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 94 from the host device via the host interface 62. The host interface 62 routes the outbound data 94 to the digital transmitter processing module 76, which processes the outbound data 94 in accordance with a particular wireless communication standard (e.g., IEEE 802.11a, IEEE 802.11b, Bluetooth, et cetera) to produce digital transmission formatted data 96. The digital transmission formatted data 96 will be a digital base-band signal or a digital low IF signal, where the low IF typically will be in the frequency range of one hundred kilohertz to a few megahertz.

The digital-to-analog converter 78 converts the digital transmission formatted data 96 from the digital domain to the analog domain. The filtering/gain module 80 filters and/or adjusts the gain of the analog signal prior to providing it to the IF mixing stage 82. The IF mixing stage 82 directly converts the analog baseband or low IF signal into an RF signal based on a transmitter local oscillation 83 provided by local oscillation module 74, which may be implemented in accordance with the teachings of the present invention. The power amplifier 84 amplifies the RF signal to produce outbound RF signal 98, which is filtered by the transmitter filter module 85. The antenna 86 transmits the outbound RF signal 98 to a targeted device such as a base station, an access point and/or another wireless communication device.

The radio 60 also receives an inbound RF signal 88 via the antenna 86, which was transmitted by a base station, an access point, or another wireless communication device. The antenna 86 provides the inbound RF signal 88 to the receiver filter module 71 via the Tx/Rx switch 73, where the Rx filter 71 bandpass filters the inbound RF signal 88. The Rx filter 71 provides the filtered RF signal to low noise amplifier 72, which amplifies the signal 88 to produce an amplified inbound RF signal. The low noise amplifier 72 provides the amplified inbound RF signal to the IF mixing module 70, which directly converts the amplified inbound RF signal into an inbound low IF signal or baseband signal based on a receiver local oscillation 81 provided by local oscillation module 74, which may be implemented in accordance with the teachings of the present invention. The down conversion module 70 provides the inbound low IF signal or baseband signal to the filtering/gain module 68. The filtering/gain module 68 filters and/or gains the inbound low IF signal or the inbound baseband signal to produce a filtered inbound signal.

The analog-to-digital converter 66 converts the filtered inbound signal from the analog domain to the digital domain to produce digital reception formatted data 90. The digital receiver processing module 64 decodes, descrambles, demaps, and/or demodulates the digital reception formatted data 90 to recapture inbound data 92 in accordance with the particular wireless communication standard being implemented by radio 60. The host interface 62 provides the recaptured inbound data 92 to the host device 18–32 via the radio interface 54.

As one of average skill in the art will appreciate, the wireless communication device of FIG. 2 may be implemented using one or more integrated circuits. For example, the host device may be implemented on one integrated circuit, the digital receiver processing module 64, the digital transmitter processing module 76 and memory 75 may be implemented on a second integrated circuit, and the remaining components of the radio 60, less the antenna 86, may be implemented on a third integrated circuit. As an alternate example, the radio 60 may be implemented on a single integrated circuit. As yet another example, the processing module 50 of the host device and the digital receiver and transmitter processing modules 64 and 76 may be a common processing device implemented on a single integrated circuit. Further, the memory 52 and memory 75 may be implemented on a single integrated circuit and/or on the same integrated circuit as the common processing modules of processing module 50 and the digital receiver and transmitter processing module 64 and 76.

FIG. 3 is a schematic block diagram of a T/R switch module 73 that includes four switching means S1 through S4 and at least two integrated circuit paths (IC Pad) coupled to two antennas 86 and 87. Each of the switching means S1–S4, which may be a switch, transistor, bidirectional switch, cross couple transistor, etc., is controlled in accordance with the T/R control signal 102. As is further shown, S1 and S3 are coupled to the transmit filter module 85 of the transmit path and switching means S2 and S4 are coupled to the receiver filter module 71 of the receiver path. The coupling of switches S1 and S3 to the transmit filter module 85 and the coupling of S2 and S4 to the receiver filter module 71 may be done via an integrated circuit pad or an internal integrated circuit node.

In operation, as shown in the corresponding table, when the T/R control signal 102 is in a first state, switching means S1 is active to couple antenna 86 to the transmit filter module 85. When the T/R control signal 102 is in a second state, switching means S2 is active to couple antenna 86 to the receive filter module 71. When the T/R control signal 102 is in a third state, the third switching means is active to couple the transmit filter module 85 to the second antenna 87. When the T/R control signal 102 is in a fourth state, the fourth switching means S4 is active to couple the receive filter module 71 to the second antenna 87. With such an on-chip T/R switching module 73, diversity antennas may be readily used by a wireless communication device and provide single switch coupling between the antenna and the corresponding transmit path or receive path.

If the switching means S1 through S4 are implemented utilizing transistors, transistors may be implemented on chip utilizing gallium arsenide process such that the parasitic components of the transistors have negligible impact on the RF signals traversing the transistors. Such operating frequencies may be in the range of a few hundred megahertz to multiple gigahertz. It, however, the switching means S1 through S4 are implemented utilizing transistors in a CMOS process the T/R switch module 73 may be implemented as shown in FIG. 4.

FIG. 4 illustrates the T/R switch module 73 to include transistors T1–T4, integrated circuit paths coupled to antennas 86 and 87, and a parasitic compensation network 100. Each of the transistors T1–T4 includes parasitic components such as parasitic capacitance, conductance and/or resistance. In this illustration only the parasitic capacitances are illustrated. To achieve a low on resistance for transistors T1–T4 (e.g. approximately 2 ohms), a significant parasitic capacitance is established. If uncompensated, the parasitic capacitance at the RF frequencies (a few hundred megahertz to multi gigahertz) would substantially attenuate the received RF signals and the transmitted RF signals. To minimize the adverse effects of the parasitic capacitance, the parasitic compensation network 100 includes inductors L1–L4 and a bias voltage circuit 104. The bias voltage circuit 104 generates a bias voltage, which functions as an AC ground for inductors L1–L4. The bias voltage may be established to correspond with a common mode voltage of a differential signaling used within the wireless communication device.

The inductance of each inductor L1–L4 is selected to resonate with two parasitic capacitances. For instance, L1 is selected to resonate with the parasitic capacitance produced by transistor T2 and T4, while inductor L3 compensates for parasitic capacitance produced by T4 and T3. Accordingly, by selecting the inductance value in conjunction with the known parasitic capacitance value, the inductor in combination with the capacitor may resonate at the operating frequencies of the receive and/or transmitted RF signals thereby substantially reducing the attenuation provided by the parasitic capacitance.

Accordingly, the transmit/receive switch module 73 FIG. 4 may be implemented in CMOS technology on a radio frequency integrated circuit and provide single switching between the transmit and receive paths and diversity antennas. By including the parasitic compensation network 100, the adverse effects of the parasitic components of CMOS implemented transistors T1–T4 are substantially avoided.

The preceding discussion has presented a on chip diversity antenna switch that may be implemented utilizing CMOS technology or other integrated circuit manufacturing technologies. By utilizing a single switching means between the transmit and receive paths and the diversity antennas, performance is enhanced over prior art techniques that required multiple T/R switches. As one of average skill in the art will appreciate, other embodiments may be derived from the teaching of the present invention without deviating from the scope of the claims.

What is claimed is:

1. An on-chip diversity antenna switch comprises:
    a first switch operably coupled to a first terminal associated with a first antenna that is to be utilized for both transmitting and receiving, in which when the first switch is closed, the first switch operably couples the first antenna to a transmitter;
    a second switch operably coupled to the first terminal associated with the first antenna, in which when the second switch is closed, the second switch operably couples the first antenna to a receiver;
    a third switch operably coupled to a second terminal associated with a second antenna that is to be utilized for both transmitting and receiving, in which when the third switch is closed, the third switch operably couples the second antenna to the transmitter; and
    a fourth switch operably coupled to the second terminal associated with the second antenna, in which when the fourth switch is closed, the fourth switch operably couples the second antenna to the receiver, wherein a transmit/receive (T/R) control signal coupled to all four switches is used to close only one switch at a given time to select between the first and second antennas to be coupled to either the transmitter or the receiver to provide T/R control of two diversity antennas used for transmitting and receiving.

2. The on-chip diversity antenna switch of claim 1, wherein switching function of each of the first, second, third, and fourth switches is performed by a transistor.

3. The on-chip diversity antenna switch of claim 2 further comprises a parasitic compensation circuit operably coupled to compensate for adverse affects induced by parasitics of the transistors.

4. The on-chip diversity antenna switch of claim 3, wherein the parasitic compensation circuit further comprises:
    a first inductor operably coupled to the first terminal and to AC ground;
    a second inductor operably coupled to the second terminal and to the AC ground;
    a third inductor operably coupled to a common transmit path of the first and third switches and to the AC ground; and
    a fourth inductor operably coupled to a common receive path of the second and fourth switches and to the AC ground.

5. The on-chip diversity antenna switch of claim 4 further comprises a bias voltage circuit operably coupled to provide a bias voltage that, at operating frequencies of the on-chip diversity antenna switch, functions as the AC ground.

6. An on-chip diversity antenna switch comprises:
    first means for coupling a first terminal associated with a first antenna that is to be utilized for both transmitting and receiving, to a transmitter when the first means for coupling is closed;
    second means for coupling the first terminal associated with the first antenna to a receiver when the second means for coupling is closed;
    third means for coupling a second terminal associated with a second antenna that is to be utilized for both transmitting and receiving, to the transmitter when the third means for coupling is closed; and
    fourth means for coupling the second terminal associated with the second antenna to the receiver when the fourth means for coupling is closed, wherein a transmit/receive (T/R) control signal coupled to all four means for coupling is used to close only one means for coupling at a given time to select between the first and second antennas to be coupled to either the transmitter or the receiver to provide T/R control of two diversity antennas used for transmitting and receiving.

7. The on-chip diversity antenna switch of claim 6, wherein switching function of at least one of the first, second, third, and fourth means for coupling is performed by a transistor.

8. The on-chip diversity antenna switch of claim 7 further comprises a parasitic compensation circuit operably coupled to compensate for adverse affects induced by parasitics of the transistors.

9. The on-chip diversity antenna switch of claim 8, wherein the parasitic compensation circuit further comprises at least one of:
    a first inductor operably coupled to the first terminal and to AC ground;
    a second inductor operably coupled to the second terminal and to the AC ground;
    a third inductor operably coupled to a common path transmit path of the first and third means for coupling and to the AC ground; and a fourth inductor operably coupled to a common receive path of the second and fourth means for coupling and to the AC ground.

10. The on-chip diversity antenna switch of claim 9 further comprises a bias voltage circuit operably coupled to provide a bias voltage that, at operating frequencies of the on-chip diversity antenna switch, functions as the AC ground.

11. A radio frequency integrated circuit (RFIC) comprises:
   transmit section operably coupled to convert baseband data into outbound radio frequency (RF) signals based on a transmit local oscillation;
   receive section operably coupled to convert received RF signals into inbound baseband data based on a receive local oscillation; and
   transmit/receive switch operably coupled to the transmit section and the receive section, wherein the transmit/receive switch includes:
      a first switch operably coupled to a first terminal associated with a first antenna that is to be utilized for both transmitting and receiving, in which when the first switch is closed, the first switch operably couples the first antenna to the transmit section;
      a second switch operably coupled to the first terminal associated with first antenna, in which when the second switch is closed, the second switch operably couples the first antenna to the receive section;
      a third switch operably coupled to a second terminal associated with a second antenna, that is to be utilized for both transmitting and receiving, in which when the third switch is closed, the third switch operably couples the second antenna to the transmit section; and
      a fourth switch operably coupled to the second terminal associated with the second antenna, in which when the fourth switch is closed, the fourth switch operably couples the second antenna to the receive section, wherein a transmit/receive (T/R) control signal coupled to all four switches is used to close only one switch at a given time to select between the first and second antennas to be coupled to either the transmit section or the receive section to provide T/R control of two diversity antennas used for transmitting and receiving.

12. The RFIC of claim 11, wherein switching function of each of the first, second, third, and fourth switches is performed by a transistor.

13. The RFIC of claim 12 further comprises a parasitic compensation circuit operably coupled to compensate for adverse affects induced by parasitics of the transistors.

14. The RFIC of claim 13, wherein the parasitic compensation circuit further comprises:
   a first inductor operably coupled to the first terminal and to AC ground;
   a second inductor operably coupled to the second terminal and to the AC ground;
   a third inductor operably coupled to a common transmit path of the first and third switches and to the AC ground; and
   a fourth inductor operably coupled to a common receive path of the second and fourth switches and to the AC ground.

15. The RFIC of claim 14 further comprises a bias voltage circuit operably coupled to provide a bias voltage that, at operating frequencies of the diversity antennas, functions as the AC ground.

16. A radio frequency integrated circuit (RFIC) comprises:
   transmit section operably coupled to convert baseband data into outbound radio frequency (RF) signals based on a transmit local oscillation;
   receive section operably coupled to convert received RF signals into inbound baseband data based on a receive local oscillation; and
   transmit/receive switch operably coupled to the transmit section and the receive section, wherein the transmit/receive switch includes:
      first means for coupling a first terminal associated with a first antenna that is to be utilized for both transmitting and receiving, to the transmit section when the first means for coupling is closed;
      second means for coupling the first terminal associated with the first antenna to the receive section when the second means for coupling is closed;
      third means for coupling a second terminal associated with a second antenna that is to be utilized for both transmitting and receiving, to the transmit section when the third means for coupling is closed; and
      fourth means for coupling the second terminal associated with the second antenna to the receive section when the fourth means for coupling is closed, wherein a transmit/receive (T/R) control signal coupled to all four means for coupling is used to close only one means for coupling at a given time to select between the first and second antennas to be coupled to either the transmit section or the receive section to provide T/R control of two diversity antennas used for transmitting and receiving.

17. The RFIC of claim 16, wherein switching function of at least one of the first, second, third, and fourth means for coupling is performed by a transistor.

18. The RFIC of claim 17 further comprises a parasitic compensation circuit operably coupled to compensate for adverse affects induced by parasitics of the transistors.

19. The RFIC of claim 18, wherein the parasitic compensation circuit further comprises at least one of:
   a first inductor operably coupled to the first terminal and to AC ground;
   a second inductor operably coupled to the second terminal and to the AC ground;
   a third inductor operably coupled to a common transmit path of the first and second means for coupling and to the AC ground; and
   a fourth inductor operably coupled to a common receive path of the second and fourth means for coupling and to the AC ground.

20. The RFIC of claim 19 further comprises a bias voltage circuit operably coupled to provide a bias voltage that, at operating frequencies of the diversity antennas, functions as the AC ground.

* * * * *